US009990286B1

United States Patent
McLaughlin et al.

(10) Patent No.: US 9,990,286 B1
(45) Date of Patent: Jun. 5, 2018

(54) MEMORY TRACKING USING COPY-BACK CACHE FOR 1:1 DEVICE REDUNDANCY

(71) Applicant: HONEYWELL INTERNATIONAL INC., Morris Plains, NJ (US)

(72) Inventors: Paul F. McLaughlin, Ambler, PA (US); William Russell Massey, Levittown, PA (US); Gary Drayton, King of Prussia, PA (US); Alexander Chernoguzov, Warrington, PA (US)

(73) Assignee: Honeywell International, Inc., Morris Plains, NJ (US)

( * ) Notice: Subject to any disclaimer, the term of this patent is extended or adjusted under 35 U.S.C. 154(b) by 0 days. days.

(21) Appl. No.: 15/588,315

(22) Filed: May 5, 2017

(51) Int. Cl.
| | |
|---|---|
| G06F 11/00 | (2006.01) |
| G06F 12/0806 | (2016.01) |
| G06F 3/06 | (2006.01) |
| G06F 12/0811 | (2016.01) |
| G05B 23/02 | (2006.01) |
| G06F 11/20 | (2006.01) |

(52) U.S. Cl.
CPC ..... *G06F 12/0806* (2013.01); *G05B 23/0289* (2013.01); *G06F 3/065* (2013.01); *G06F 3/067* (2013.01); *G06F 3/0619* (2013.01); *G06F 11/2028* (2013.01); *G06F 11/2097* (2013.01); *G06F 12/0811* (2013.01); *G06F 2212/283* (2013.01); *G06F 2212/621* (2013.01)

(58) Field of Classification Search
CPC ............. G06F 11/2028; G06F 11/2038; G06F 11/2097
See application file for complete search history.

(56) References Cited

U.S. PATENT DOCUMENTS

| | | | | | |
|---|---|---|---|---|---|
| 4,958,270 | A | * | 9/1990 | McLaughlin | G05B 9/03 700/82 |
| 4,959,768 | A | * | 9/1990 | Gerhart | G06F 11/2038 700/82 |
| 5,136,498 | A | * | 8/1992 | McLaughlin | G06F 11/2017 700/3 |
| 5,712,970 | A | * | 1/1998 | Arnott | G06F 11/1666 711/113 |
| 5,963,448 | A | * | 10/1999 | Flood | G06F 11/2097 700/19 |
| 6,170,044 | B1 | * | 1/2001 | McLaughlin | G05B 9/03 711/112 |
| 2014/0082413 | A1 | * | 3/2014 | Bilich | G06F 11/2041 714/12 |

* cited by examiner

*Primary Examiner* — Philip Guyton
(74) *Attorney, Agent, or Firm* — Jetter & Associates, P.A.

(57) ABSTRACT

A redundant process controller arrangement includes a primary controller and parallel connected secondary controller each coupled to actuators and sensors coupled to processing equipment. The primary and secondary controllers include a main writable memory including a cache data control algorithm, central processing unit (CPU) with cache memory including cache not supporting write-thru, tracker logic coupled to a control cycle database in a tracked memory region and to a primary tracking buffer. A redundancy link is between the CPUs for passing tracked changes. The algorithm implements memory tracking using copy-back including the primary tracker logic each cycle writing tracked changes into the primary tracking buffer, and at cycle end, transferring tracked changes from the primary tracking buffer to the secondary controller over the redundancy link, and writing tracked changes to the secondary control database.

15 Claims, 3 Drawing Sheets

MEMORY TRACKING USING COPY-BACK CACHE FOR 1:1 DEVICE REDUNDANCY

FIELD

Disclosed embodiments relate to the updating of a secondary database of a redundant process controller in a process control system, and more particularly, to an apparatus for tracking changes of predetermined data of a primary database for subsequent updating of a secondary database.

BACKGROUND

The failure of an industrial control system can lead to costly downtime. There is expense involved in restarting a process along with the actual production losses resulting from a failure. If the process is designed to operate without supervisory or service personnel, all of the components in the process control system generally need to be fault-tolerant.

A fault-tolerant industrial process control system may employ a 1:1 redundancy system to synchronize the central processing unit (CPU) data in memory, where memory is maintained in an identical fashion in both a primary memory associated with a primary process controller and a secondary memory associated with a secondary process controller using an initial memory transfer followed by updates that are tracked changes to the primary memory image. As known in the art, a memory cache (cache) is a high-speed buffer for use with a lower-speed random access memory (RAM). CPU's without a memory cache (cache) express all changes to the RAM bus where they are captured (data and address). CPU's with write-through caching act in a similar manner. In contrast, CPUs with a cache commonly used for process control systems that need to react to process changes rapidly may not support write-thru caching.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize a problem for process control systems having a primary controller with a CPU including cache memory (the fastest memory) that does not support write-thru is the inability to provide predictable or deterministic capture of control cycle data at the end of a control cycle by a conventional hardware memory tracker. Without determinism one cannot update a parallel connected redundant secondary process controller employed as a backup controller in a timely fashion, and the control system cannot be sure all the process changes for a given cycle are captured for a secure backup from the primary process controller to the secondary process controller.

Disclosed embodiments provide a method and new architecture for 'flushing' control database changes to the main memory of the primary controller at the end of control cycle so they can be captured deterministically for transfer to the secondary process controller. A copy-back cache flush operation is used with the redundancy subsystem to flush the cache of any changes at the time so that the control execution drives to an atomic cleanpoint. (i.e., a complete set of changes for one cycle). This enables the secondary controller to be updated each cycle with a complete and coherent set of tracked changes from the primary controller.

One disclosed embodiment comprises a method of memory tracking using copy-back cache for 1:1 device redundancy comprising providing a redundant process controller arrangement for an industrial control system comprising a primary controller and a parallel connected redundant secondary controller both coupled by input/outputs (IOs) to actuators and sensors coupled to processing equipment. The primary controller includes a primary main writable memory including a tracked memory region with a control cycle database residing therein, a primary tracking buffer and a cache data control algorithm, a central processing unit (CPU) with cache memory including cache that does not support write-thru, and tracker logic coupled by a memory controller to the control cycle database in the tracked memory region and to the primary tracking buffer. The secondary controller like the primary controller being a redundant controller also includes a main writable memory including a tracked memory region with a control cycle database residing therein, a tracking buffer and a cache data control algorithm, a CPU including a cache memory including cache that does not support write-thru, and tracker logic coupled by a memory controller to the control cycle database residing in the tracked memory region and to the tracking buffer. A redundancy link is between the CPUs.

The algorithm implements the primary tracker logic writing tracked changes into the primary tracking buffer during each cycle, and responsive to an end of cycle notification the tracked changes are transferred from the primary tracking buffer to the secondary controller over the redundancy link. The tracked changes are then written to the secondary control database.

DETAILED DESCRIPTION

Figure 1:
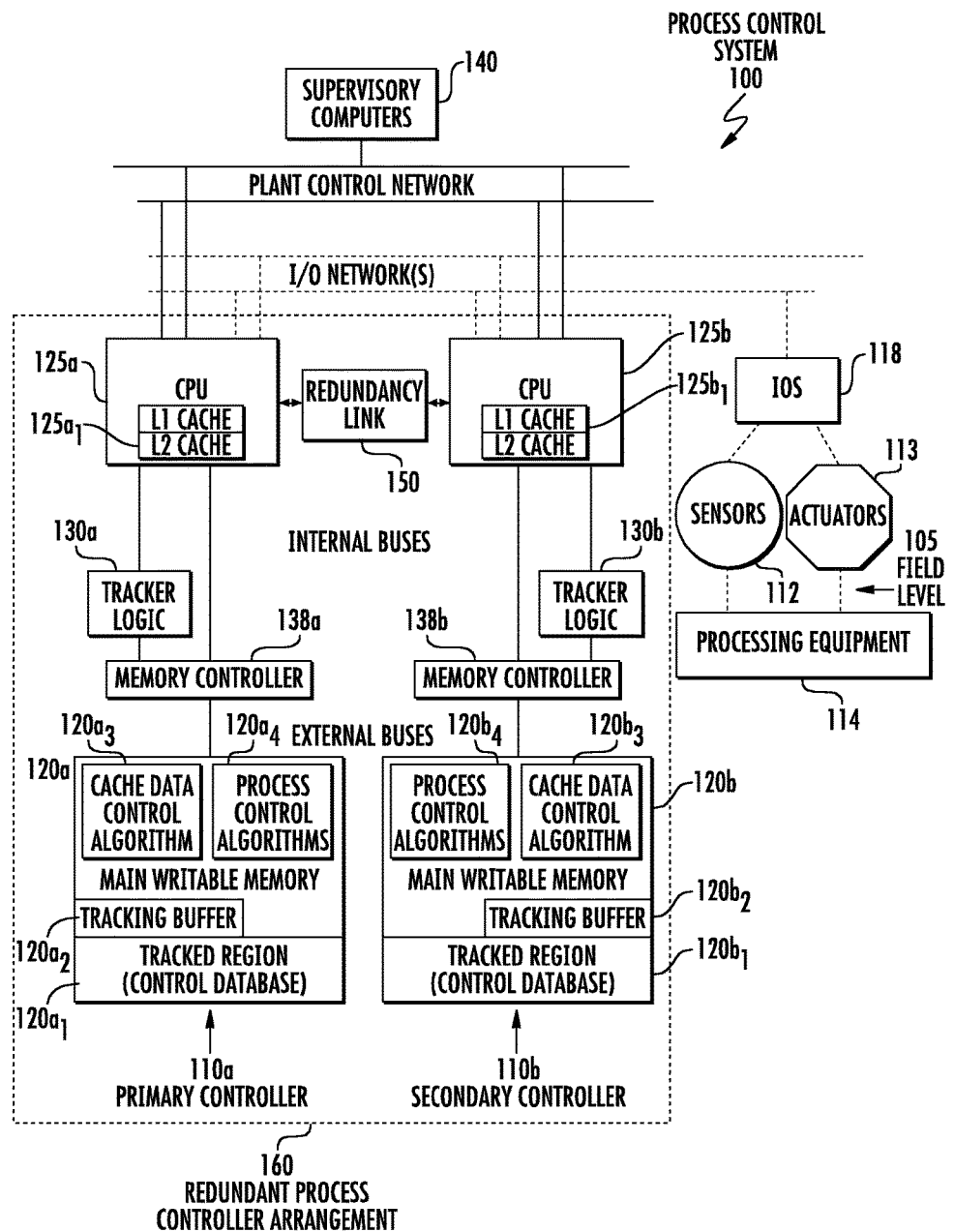
FIG. 1 shows an example industrial control system including a redundant process controller arrangement including a primary controller and a redundant secondary controller both coupled to control processing equipment, where the redundant process controller arrangement implements memory tracking using copy-back cache for 1:1 controller redundancy, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

As known in the art, algorithms such as disclosed algorithms may be implemented by hardware or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic. Regarding software-based algorithm implementations, algorithm code stored in the associated memory can be implemented by the processor.

FIG. 1 shows an example industrial control system 100 comprising a redundant process controller arrangement 160 that implements memory tracking using copy-back cache for 1:1 controller redundancy including a primary controller 110a and a redundant secondary controller 110b both coupled by input/outputs (IOs) 118 to actuators 113 and sensors 112 coupled to processing equipment 114 on a field level 105, according to an example embodiment. 'Redundant' as used herein means functionally the same with respect to its process control functions which does allow for different device implementations or memory sizes for example. In practice, the hardware tracking needs identical hardware and software in the primary and secondary controller as a backup because they are generally needed to be able to exchange roles, the tracked memory addresses be identical in the primary and secondary in order for the database changes to be applied, and the databases contain pointers to software functions in the main writable memories comprising primary writable memory 120a and secondary writable memory 120b. The IO networks shown couple various inputs and outputs to the primary controller 110a and secondary controller 110b including analog inputs (A/I), analog outputs (A/O), digital inputs (D/I), and digital outputs (D/O), these inputs and outputs being connected to various valves, pressure switches, pressure gauges, thermocouples, which are used to indicate the current information or status to enable controlling the process.

The primary controller 110a includes a primary main writable memory 120a including a primary cache data control algorithm 120a3, and a primary process control algorithms 120a4 for controller the processing equipment 114. A primary central processing unit (CPU) 125a has cache memory 125a1 shown including L1 cache (fastest cache) that does not support write-thru and a L2 cache that supports write-thru. Primary tracker logic 130a is coupled by a primary memory controller 138a to a primary control cycle database (primary control database) residing in a primary tracked memory region 120a1 and to a primary tracking buffer 120a2 both shown by example in the same primary main writable memory 120a. The primary main writable memory 120a is optionally a non-volatile memory that can comprise RAM (static RAM (SRAM) for non-volatile memory).

The secondary controller 110b analogously includes a secondary main writable memory 120b (e.g., RAM) including a secondary cache data control algorithm 120b3, and secondary process control algorithms 120b4. The secondary CPU 125b has cache memory 125b1 shown including L1 cache that does not support write-thru and L2 cache that does support write-thru. Secondary tracker logic 130b is coupled by a secondary memory controller 138b to a secondary control database residing in a secondary tracked memory region 120b1 and to a secondary tracking buffer 120b2 both in the secondary main writable memory 120b.

There is a redundancy link 150 between the primary CPU 125a and secondary CPU 125b. The CPUs 125a, 125b are connected to a plant control network (PCN) including the supervisory computers 140 shown. The PCN generally includes operator stations and controllers. The IOs 118 shown refer to any I/O either local to the controller or connected via some communication medium.

All read and write accesses of the tracking buffers 120a2 120b2 and the control databases in the track regions 120a1, 120a2 go through the respective tracker logic 130a, 130b. In the primary controller 110a tracked changes (writes/stores) are also saved in the primary tracking buffer 120a2, so that only the tracked changes are subsequently copied to the secondary controller 110b over the redundancy link 150. In the secondary controller 110b, redundancy data is copied to the secondary tracking buffer 120b2 area until it is processed at a cleanpoint (cleanpoint is a consistent set of changes to allow detecting lost packets to ensure cleanpoint) and only then used to update the control database in the secondary tracked memory region 120b1.

At the end of a control cycle, primary cache memory 125a1 may still hold changes intended for primary tracked database 120a1, therefore primary cache memory 125a1 is purged by a "flush" operation that forces all changes to be written to the primary tracked database 120a1. The tracking buffers 120a2/120b2 thus contain all control database changes associated with the control cycle. As described above the changes are transferred to the secondary controller 110b by the redundancy link 150. The tracking buffers 120a2, 120b2 are shown separate from the main writable memory 120a, 120b. This may be a physical or a logical separation. In a physical separation there is a separate bank of main writable memory 120a, 120b. In the logical separation, the memory accesses for control database in the tracked region 120a1 are redirected to an area of the main writable memory 120a, 120b that is not accessed any other way.

Figure 2:
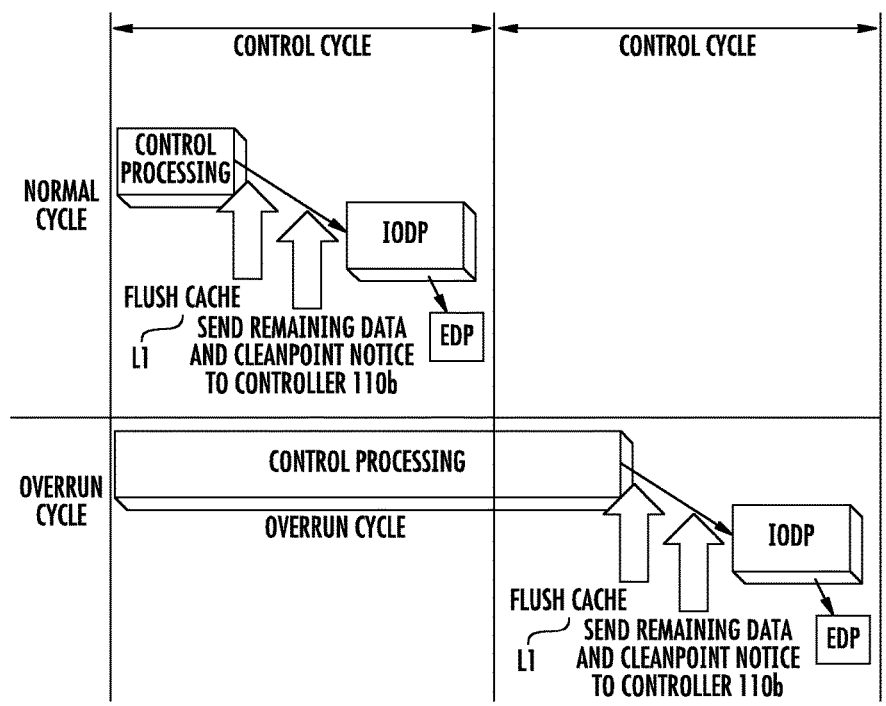
FIG. 2 shows an example Control Execution Environment data cycle for a disclosed redundant process controller arrangement that implements memory tracking using copy-back cache for 1:1 controller redundancy for both a 'normal' cycle and an 'overrun' cycle, according to an example embodiment.

FIG. 2 shows an example Control Execution Environment (CEE) cycle for a disclosed redundant process controller arrangement that implements memory tracking using copy-back cache for 1:1 controller redundancy for both a 'normal' cycle and an overrun cycle. Much of the CCE cycle is taken up with CEE function block processing shown as "control processing". At the end of this 'budgeted' cycle processing, the last control data to the primary tracked region 120a1 is flushed and cleanpoint message is sent to 'tell' the secondary controller 110b to update the secondary cached control database 120b1 with the new control data from this cycle. The I/O data processing performed by the IODP block shown follows the cleanpoint notice. The I/O processing generally comprises sending outputs from control algorithms to actuators, and prefetching sensor inputs from sensors for use in the next cycle.

In the normal cycle shown all events shown are accomplished in one control cycle including flushing the cache, sending the tracked data and a cleanpoint notice to the secondary controller 110b, and IODP block. In the overrun cycle shown, overrun occurs when the control algorithms consume more that the allotted system time (e.g., 50 msec), so that the system slips one control cycle into a second control cycle in order to provide time for flushing the cache and sending the tracked data and a cleanpoint notice to the secondary controller 110b, and the IODP block, so that any control database changes after the cleanpoint message in the overrun cycle sent becomes part of the next cycle's changes. 'Unbudgeted' processing then may be performed, which includes parameter access. The external data processing (EDP) block fetches from and supplies data to other process controllers and user interfaces. These and several other tasks also access the control database in the tracked regions. A new control cycle cannot generally be started until the secondary controller 110b acknowledges that it has received a complete set of changes for the current cycle.

Controller redundancy generally includes a database end-to-end check. At the end of each cycle, a block of memory is generally checksummed (e.g., a cyclic redundancy check (CRC)-32, but any efficient CRC or hashing function will generally do) and the address of the block of memory is sent to the secondary controller 120b in the cleanpoint message. After updating the control database 120b1, the secondary controller 120b checksums the same block and verifies the checksum. If there is a mistake in the secondary tracking buffer 120b2, or if there are incorrect writes to the control database in the secondary tracked memory region 120b1, this check will eventually catch it.

Redundancy synchronization may be dropped under a number of conditions. For example, an end-to-end checksum failure in backup, message sequence number gap in backup, Hardware Error (DMA overrun in backup/DMA underrun in primary), cleanpoint overrun in backup (too much data received to hold and/or process before the next data starts arriving). Also, unrecognizable data in tracker buffer in backup, DRAM read/write error, operator commanded drop sync and failover/switchover (failure of the primary or operator commanded role change).

Figure 3:
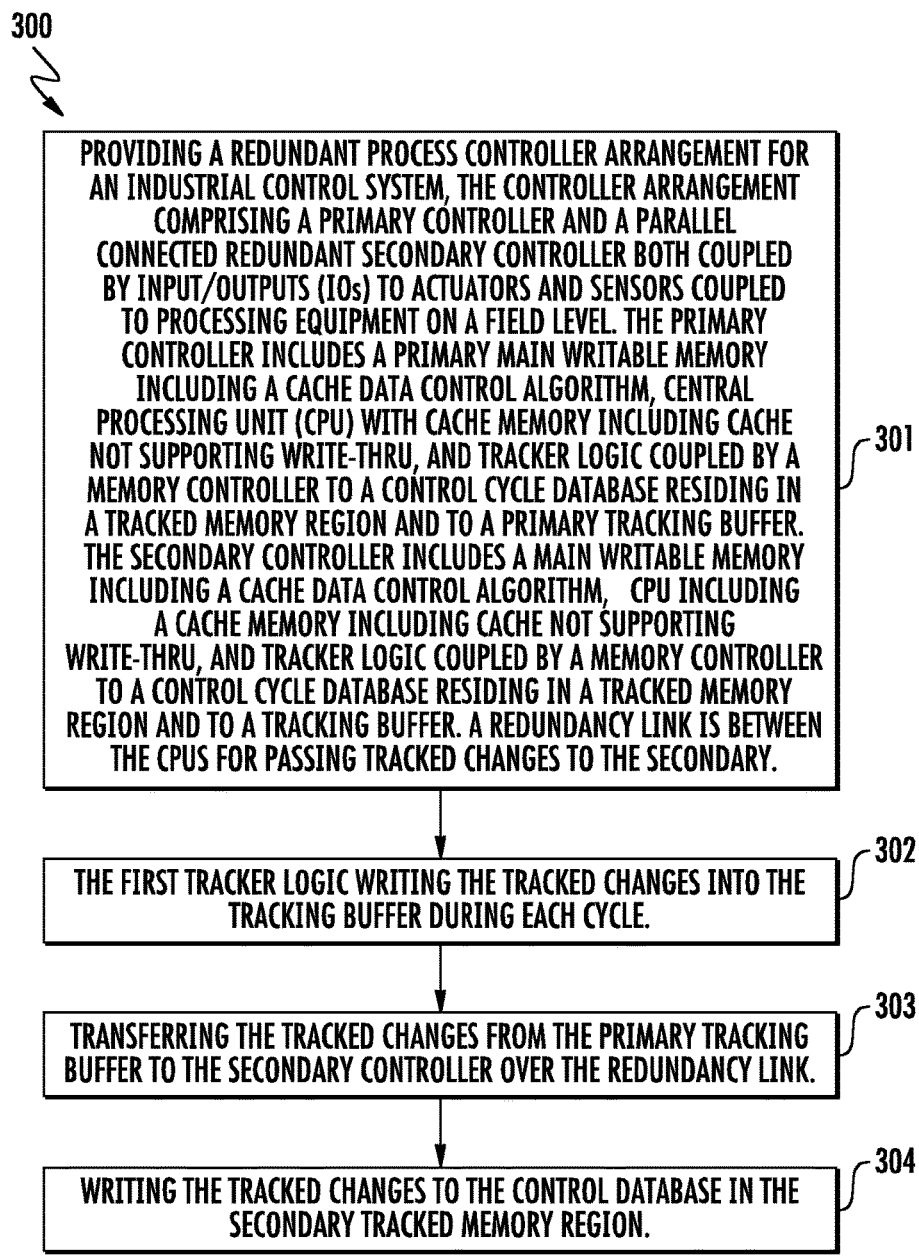
FIG. 3 is a flow chart that shows steps in a method of memory tracking using copy-back cache for 1:1 controller redundancy, according to an example embodiment.

FIG. 3 is a flow chart that shows steps in an example method 300 of memory tracking using copy-back cache for 1:1 controller redundancy, according to an example embodiment. Step 301 comprises providing a redundant process controller arrangement for an industrial control system, the controller arrangement comprising a primary controller and a parallel connected redundant secondary controller both coupled by IOs to actuators and sensors coupled to processing equipment on a field level. The primary controller includes a primary main writable memory including a primary cache data control algorithm, primary CPU with cache memory including cache that does not support write-thru, such as a L1 cache that does not support write-thru and a L2 cache that when present supports write-thru, primary tracker logic coupled by a primary memory controller to a primary control cycle database residing in a primary tracked memory region and to a primary tracking buffer. The secondary controller includes a secondary main writable memory including a secondary cache data control algorithm, secondary CPU including a cache memory generally including L1 cache that does not support write-thru, and L2 cache that does support write-thru, and secondary tracker logic coupled by a secondary memory controller to a secondary control cycle database residing in a secondary tracked memory region and to a secondary tracking buffer. A redundancy link is between the primary CPU 125a and secondary CPU 125b for passing tracked changes to the secondary.

Step 302 comprises the primary tracker logic 130a writing the tracked changes into the primary tracking buffer 120a2 during each cycle. The primary tracking buffer 120a2 is generally smaller in size compared to the primary tracked memory region 120a1. The writing is generally performed in essentially real-time. Responsive to an end of cycle notification, step 303 and 304 are performed. Step 303 comprises transferring the tracked changes from the primary tracking buffer 120a2 to the secondary controller 110b over the redundancy link 150. Step 304 comprises writing the tracked changes to the secondary control database in the secondary tracked memory region 120b1.

New disclosed hardware includes the above-described tracker logic 130a, 130b. As described above the tracker logic 130a, 130b supports the CPUs 125a, 125b by reading tracked changes from primary cache memory 125a1 in cache line blocks (32 bytes), writing cache line blocks to the primary tracked database 120a1 (via memory controller 138), and writing copies of the written data (via redundancy link 150 to secondary cache 125b1 via secondary tracker logic 130b) to the tracking buffers 120a2, along with the address information necessary for the secondary controller 110b make the same changes to its copy of the database to its secondary tracking buffer 120b2.

Disclosed memory tracking using copy-back cache for 1:1 controller redundancy has applications including for applications where a large body of proven existing control code which assumes a transparent hardware memory tracker based on write-thru cache is being ported to a new product architecture which only supports copy-back cache. Disclosed memory tracking enable by tracker logic provides the expected redundancy support under a new disclosed architecture without modifying the bulk of the code, thus avoiding the requalification that would otherwise be necessary.

Regarding 'snooping', in the target controller architecture, it is not practical for this kind of pseudo-memory controller to snoop internal busses (not shown in FIG. 1) to identify accesses to the tracked memory region. Moreover, it is recognized snooping does not automatically insure that all changes were written to the tracking buffers unless the cache were flushed. It is also recognized one is not any better off; in fact may be worse off, because the FPGA is slow relative to the internal bus. By only accessing the tracker through a memory address range that is designated for this purpose, disclosed memory tracking using copy-back cache for 1:1 controller redundancy results in no performance impact on other controller operations.

EXAMPLES

Disclosed embodiments are further illustrated by the following specific Examples, which should not be construed as limiting the scope or content of this Disclosure in any way.

The necessary control cycle that bounded the ability to perform the needed memory flush for the particular control system was about a 50 ms cycle time is currently representative for the process control industry. Timing experiments evidenced that disclosed methods can 'empty' the primary cache 125a1 comprising 512 kB L2 cache that supports write-thru, and 32 kB L1 cache that does not support write-thru in 2 ms versus a whole primary main writable memory 120a purge time of >400 ms, which is consistent with the cache being 2 orders of magnitude smaller than the overall database size in the primary main writable memory 120a implemented as a 256 Mbyte RAM.

The primary CPU 125a used required separate flush operations for its L1 and L2 caches. Applicants tried all published LINUX cache flush operations, which took a minimum of 80 ms for flushing the needed 48 MB of control database in primary tracked region 120a1. Applicants tried flushing the cache by reading 1 MB of RAM, which is larger than the 512 KB level 2 cache and 32 KB level 1 cache combined. In theory this should have pushed all cycle changes out of the primary cache memory 125a1, but it was found to sometimes not push all cycle changes out. Flushing also took 180 ms to 200 ms. Applicants next placed the L2 cache in write-thru mode and flushed just L1 cache, which took only 2 ms. The performance loss by using the L2 cache in write-thru mode was thus acceptable, and this method was selected for implementation in the redundant process controller pair process controller product.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of memory tracking using copy-back, comprising:
providing a redundant process controller arrangement for an industrial control system comprising a primary controller and a parallel connected redundant secondary controller both coupled by input/outputs (IOs) to actuators and sensors coupled to processing equipment, said primary controller including a primary main writable memory including a primary tracked memory region with a primary control cycle database residing therein, a primary tracking buffer and a cache data control algorithm, a primary central processing unit (CPU) with cache memory including a cache not supporting write-thru, and primary tracker logic coupled by a memory controller to said primary control cycle database in said primary tracked memory region and to said primary tracking buffer, said secondary controller including a secondary main writable memory including a secondary tracked memory region with a secondary control cycle database residing therein, a secondary tracking buffer and a secondary cache data control algorithm, a secondary CPU including a cache memory including a cache not supporting write-thru, secondary tracker logic coupled by a memory controller to said secondary control cycle database residing in said secondary tracked memory region and to said secondary tracking buffer, and a redundancy link between said primary CPU and said secondary CPU;
said primary tracker logic writing tracked changes into said primary tracking buffer during each cycle, and
responsive to an end of cycle notification, said algorithm:
transferring said tracked changes from said primary tracking buffer to said secondary controller over said redundancy link, and
writing said tracked changes to said secondary control cycle database.

2. The method of claim 1, wherein said tracker logic performs cache line reading and writing of said cache memory for said primary main writable memory, and includes registers which define an address range in said primary main writable memory that corresponds to a tracked address range for said tracked changes, a start and end of said primary tracking buffer, and a pointer showing how much of said tracked changes has been written to said primary tracking buffer.

3. The method of claim 1, further comprising after said end of cycle notification purging said L1 cache of said primary cache memory of all its contents and writing all said tracked changes to said primary control cycle database.

4. The method of claim 1, wherein said tracker logic resides in a field-programmable gate array (FPGA) and said primary main writable memory and said secondary main writable memory both comprise random access memory (RAM),
wherein said FPGA in said primary controller is programmed to recognize a unique address range through which a primary tracked memory region is accessed, and wherein said primary tracker logic uses said memory controller to access said primary main writable memory at its normal hardware address, and wherein said access to said primary tracked memory region is only permitted through said unique address range.

5. The method of claim 1, wherein following a command or failure of said primary controller, said secondary controller becomes a backup primary controller and assumes controlling of said processing equipment.

6. The method of claim 1, further comprising controlling an industrial process using said secondary controller during a fault of said primary controller operating on current data reflecting said tracked changes in a last cycle.

7. The method of claim 1, wherein said cache memory in said primary and said secondary controller includes a level 1 (L1) cache that does not support write-thru and a L2 cache that supports write-thru.

8. A redundant process controller arrangement for a process control system, comprising:

a primary controller and a parallel connected redundant secondary controller both coupled by input/outputs (IOs) to actuators and sensors coupled to processing equipment;

said primary controller including a primary main writable memory including a primary tracked memory region with a primary control cycle database residing therein, a primary cache data control algorithm, primary central processing unit (CPU) with cache memory including cache that does not support write-thru, primary tracker logic coupled by a primary memory controller to a primary control cycle database residing in a primary tracked memory region and to a primary tracking buffer, said secondary controller including a secondary main writable memory including a secondary tracked memory region with a secondary control cycle database residing therein, a secondary tracking buffer a secondary cache data control algorithm, secondary CPU including a cache memory including cache not supporting write-thru, secondary tracker logic coupled by a secondary memory controller to a secondary control cycle database residing in a secondary tracked memory region and to a secondary tracking buffer; and a redundancy link between said primary CPU and said secondary CPU for passing tracked changes to said secondary CPU;

said cache data control algorithms for implementing a method of memory tracking using copy-back, comprising:

said primary tracker logic during each cycle writing said tracked changes into said primary tracking buffer, and responsive to an end of cycle notification, said algorithm:
transferring said tracked changes from said primary tracking buffer to said secondary controller over said redundancy link, and
writing said tracked changes to said secondary control cycle database.

9. The redundant process controller arrangement of claim 8, wherein said tracker logic is for performing cache line reading and writing of said cache memory for said primary main writable memory, and includes registers which define an address range in said primary main writable memory that corresponds to a tracked address range for said tracked changes, a start and end of said primary tracking buffer, and a pointer showing how much of said tracked changes has been written to said tracking buffer.

10. The redundant process controller arrangement of claim 8, wherein said algorithm further implements after said end of cycle notification purging said L1 cache of said primary cache memory of all its contents and writing all said tracked changes to said primary control cycle database.

11. The redundant process controller arrangement of claim 8, wherein said tracker logic resides in a field-programmable gate array (FPGA) and said primary main writable memory and said secondary main writable memory both comprise random access memory (RAM), and wherein said FPGA in said primary controller is programmed to recognize a unique address range through which said primary tracked memory region is accessed, and wherein said primary tracker logic uses said primary memory controller to access said primary main writable memory at its normal hardware address, and wherein said access to said primary tracked memory region is only permitted through said unique address range.

12. The redundant process controller arrangement of claim 8, wherein following a command or failure of said primary controller, said algorithm further implements said secondary controller becoming a backup primary controller and assuming controlling of said processing equipment.

13. The redundant process controller arrangement of claim 8, wherein said cache memory including a level 1 (L1) cache that does not support write-thru and a L2 cache that supports write-thru.

14. The redundant process controller arrangement of claim 11, wherein said primary and said secondary tracking buffer is smaller in size compared to said primary and said secondary tracked memory region.

15. The redundant process controller arrangement of claim 8, wherein said primary main writable memory and said secondary main writable memory both comprise non-volatile memory.

* * * * *